UNITED STATES PATENT OFFICE.

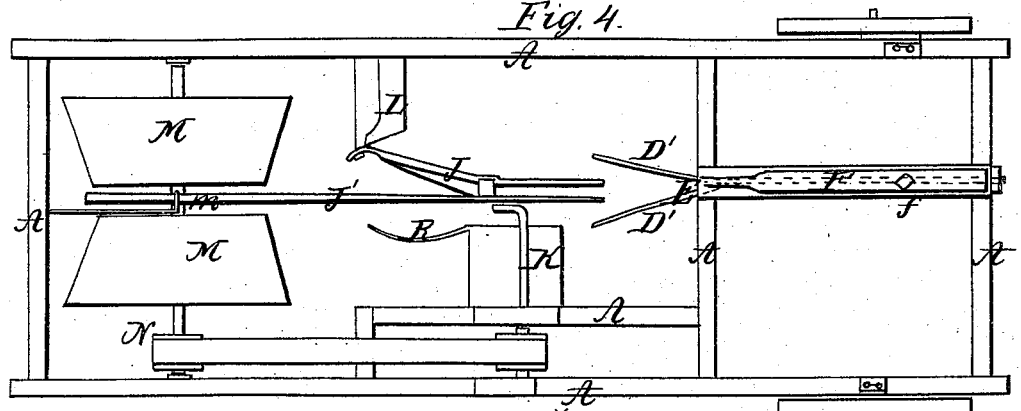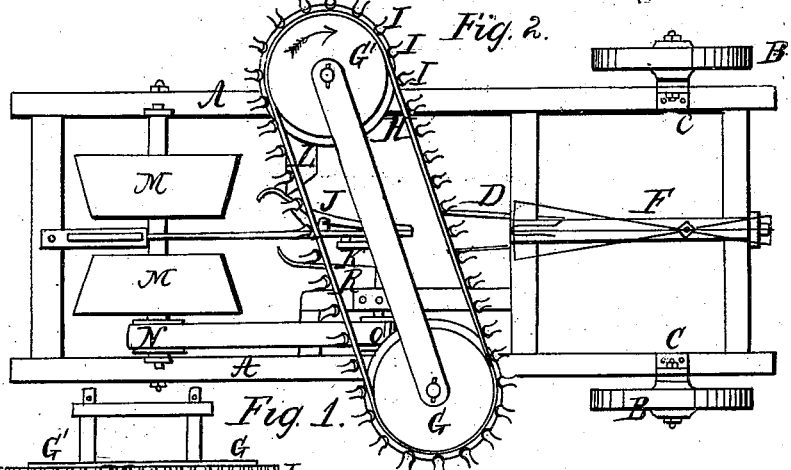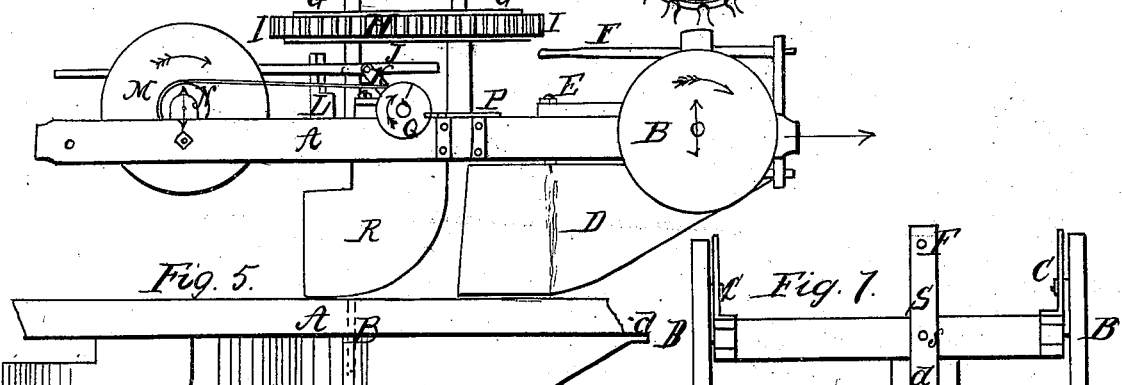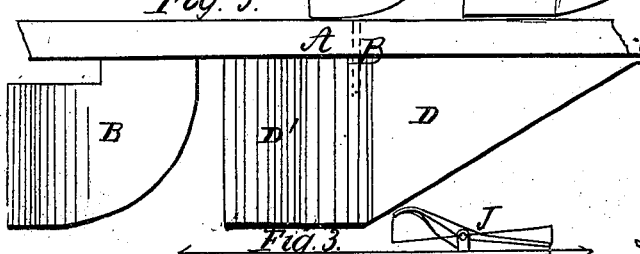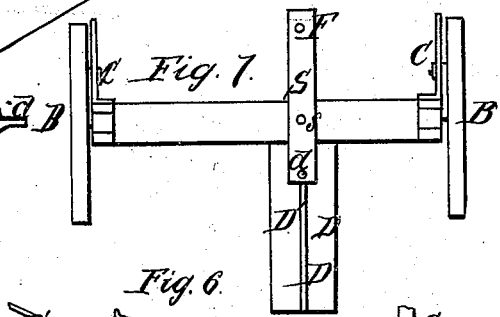

JOHN H. HOLBERT, OF OTTAWA, ILLINOIS, ASSIGNOR TO HIMSELF, ELIAS P. READ, AND T. W. McFARLAND, OF SAME PLACE.

IMPROVEMENT IN HEDGE-SETTERS.

Specification forming part of Letters Patent No. 92,961, dated July 27, 1869; antedated July 5, 1869.

*To all whom it may concern:*

Be it known that I, JOHN H. HOLBERT, of Ottawa, in the county of La Salle and State of Illinois, have invented a new and useful Improved Hedge-Setter; and I do hereby declare and make known that the following is a full, clear, and exact description of the same, reference being had to the accompanying drawings and the letters and figures marked thereon, which form part of this specification.

My said invention consists in a machine of novel construction designed to facilitate the setting out of hedge-plants or other nursery stock which are to be set in rows and near together in the row, whereby such plants can be set out much faster and at less expense than has hitherto been done, the said plants being set at a uniform depth in the soil, and with great regularity as respects their distance from each other in the row.

To enable those skilled in the art to understand how to construct and use my said invention, I will proceed to describe the same with particularity, making reference in so doing to the aforesaid drawings, in which—

Figure 1 represents a side elevation of my invention. Fig. 2 is a plan or top view of the same. Fig. 3 is a plan view, detached, of the mechanism which seizes the plants and deposits them in the ground. Fig. 4 represents a plan view, with the endless chain for carrying the plants removed. Fig. 5 is an enlarged detached side view of the devices for opening the ground and covering the plants. Fig. 6 is a bottom view of the device for opening the ground or forming the trench, and Fig. 7 is a front end elevation of the machine.

Similar letters of reference in the several figures denote the same parts of my said invention.

The lines in red indicate the movements and the extent and direction of the movements of the movable parts.

A represents a suitable frame, constructed of timber of suitable size, whose front end is supported upon two wheels, B B, by means of the slotted vertical standards C C, so that the wheels may be raised and lowered to regulate the depth of the opening or trench made in the earth by the peculiarly-formed cutter D to receive the plants.

D D' represents the trench cutter or opener, which is secured to the frame by a pin or rod, E, which passes through the cross-piece A and enters a socket in the cutter at that point where it divides into two flaring wings, as clearly shown in the drawings, said pin serving as a pivot upon which the cutter may have a lateral movement, as hereinafter specified. The front end of said cutter is provided with a pin, *d*, which enters a socket in the lower end of a bar, S, which is pivoted at *s* to the frame of the machine. A lever, F, is pivoted to the frame at *f*, and has its front end connected with the upper end of the aforesaid bar S, as shown, so that by moving the rear end of said lever F to the right or left a corresponding motion is communicated to the front end of the cutter D, the pivoted connection E permitting said movement, so as to guide or point said cutter and direct the machine in the desired direction. The cutter D is made with its rear wings as shown, so that the front inclined edge will cut the soil, and the flanges or wings D' D' will open or form a trench therein, in which the plants are placed in the space between said wings, the rear of the cutter being left entirely open and unobstructed, so that the machine may pass along without displacing or disturbing the plants so set in the ground, while the trench is kept open by said wings by inserting the same in the earth between said wings, either by the means herein shown or any other suitable means, or by hand, if desired.

R represents a runner having a curved wing, which is arranged behind it at one side of the trench-opener, so as to press the earth back against the plants, covering them properly, and closing said trench, as desired.

Instead of the means herein shown for guiding or moving the cutter D, any other suitable means may be employed.

Over the cutter D are arranged the pulleys G G', carrying an endless belt, H, to which are attached a series of small spring-pinchers, (marked I,) into which pinchers the hedge-plants are placed by hand, one plant being placed in each of the series of pinchers or clamps. A metallic grip, J, operated by a crank, K, seizes the hedge-plants one by one as they are brought around to the proper position by the belt H, and deposits them in the furrow or trench between the wings D' D'. The grip J is opened twice at each revolution of the crank K, once to seize the plant and once to deposit it in the trench, the grip being held together by a spring, except when opened as aforesaid, which effect is produced by the action of the inclined block L, against which the curved arm of the grip strikes in its revolution.

M M represent two beveled wheels or rollers, hung in such a manner as to be adjustable vertically, which are arranged at the rear part of the machine to roll and press the earth up against the row of plants. Said rollers also serve as driving-wheels to propel the devices for depositing the plants in the trench, the shaft of said rollers being provided with a drum, N, from which a belt passes to the drum O on the shaft K. Upon the end of said shaft K is a screw, Q, which engages with a pinion, P, upon the shaft carrying the pulley G, so that the revolution of the crank-shaft K revolves the endless chain of clamps I, and also moves the clamp or grip J around in a vertical plane, which takes the plants from the holders I and drops them into the ground, as desired. The grip or clamp J is provided with an arm or bar, J, passing through a loop at $m$, which slides longitudinally in its bearing and serves to keep the clamp J in the proper position as it revolves.

Having described the construction and operation of my said invention, I will proceed to specify what I claim and desire to secure by Letters Patent:

1. The trench-opener, when constructed of front cutter, D, and two vertical wings, D' D', at the rear thereof, forming a space between entirely open and unobstructed at the top and rear, so that the plants may be put down through the top and fixed in the ground without being displaced by the onward progress of the machine, as and for the purposes set forth.

2. So attaching and connecting said trench-opener D D' to the frame of the machine that the same may be moved upon its pivoted attachment, in the manner and for the purposes specified.

3. In combination with said trench-opener, the bar S and lever F, arranged and operating as and for the purpose shown and described.

4. In combination with said trench-opener D D', the arrangement of the vertical curved runner R in such a manner as to move the soil laterally toward the row of plants and press the soil close against the said plants, in the manner herein shown and specified.

5. In combination with said trench-opener and runner R, the beveled rollers M, arranged and operating as and for the purposes set forth.

6. The belt H, when provided with a series of pinchers or plant-holders, arranged and operating substantially as and for the purposes described.

7. The grip J, in combination with a crank, K, and inclined block L, in the manner and for the purposes specified.

8. The combination of the shaft K and gearing connecting the same with the pulley G and belt H, with pinchers I, in the manner set forth.

JOHN H. HOLBERT.

Witnesses:
  JOHN S. DEWEY,
  W. BUSHUITT.